Patented May 9, 1939

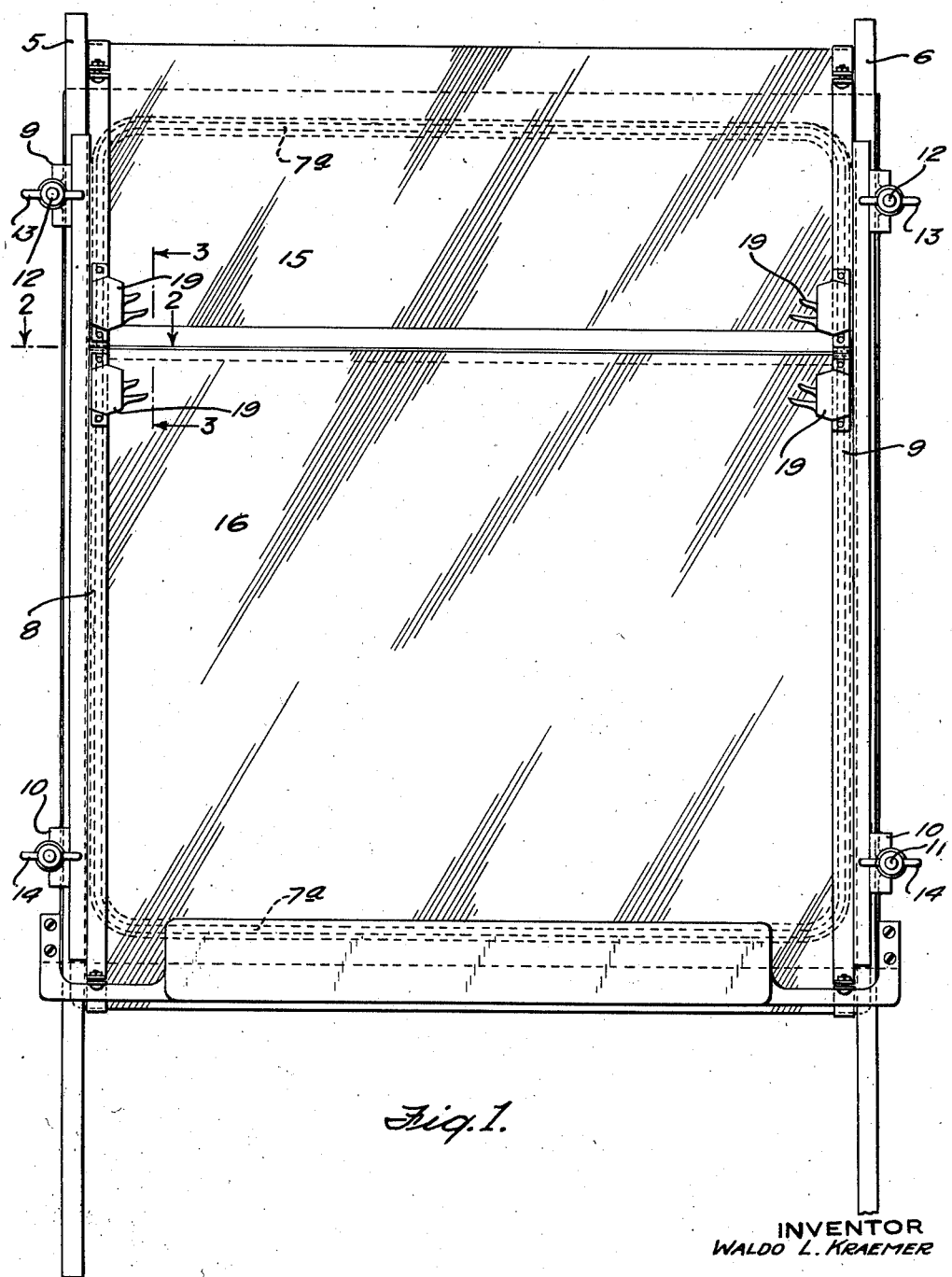

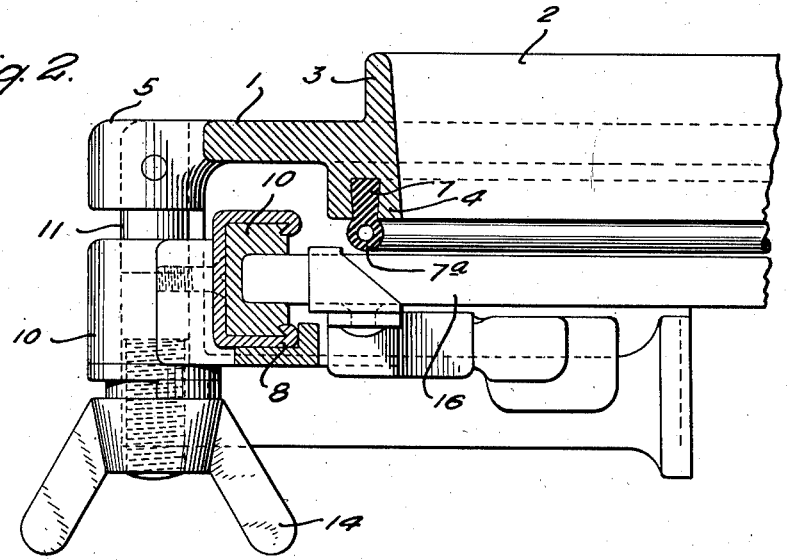

2,157,210

UNITED STATES PATENT OFFICE 2,157,210

PILOT-HOUSE WINDOW

Waldo L. Kraemer, Brooklyn, N. Y., assignor to Kearfott Engineering Co., Inc., a corporation of New York Application September 30, 1937, Serial No. 166,681

2 Claims. (Cl. 114—177)

The invention herein disclosed relates to a window construction suitable for the pilot-house of a ship and in particular to a weather-tight window construction adapted to provide an adjustable vision slot for the pilot.

An object of the invention is to provide a window construction for the pilot-house of a ship that may be made weather-tight, but with which a vision slot may be formed, in bad weather, at the height of the pilot's eyes. Another object of the invention is to provide a window of this type which when a vision slot is formed therein is otherwise weather-tight. A further object of the invention is to provide such a window construction in which the height of the vision slot is adjustable.

These and other objects and certain advantages that will hereinafter appear are realized in accordance with this invention by providing a unitary window construction that includes two panes of glass that normally, in the closed position, meet above the vertical center of the window opening. The window construction includes a frame having a window opening therethrough and window-pane guideways that are mounted on the frame for movement laterally of the frame. Two window panes are mounted in the window-pane guideways and in the closed position meet above the vertical center of the window opening. The combined length of the window panes is such that in the closed position the window panes extend a substantial distance above and below the window opening through the frame. A gasket is mounted on the frame and extends laterally therefrom and around the window opening and means are provided for moving the window-pane guideways to clamp the window panes against the gasket and thus effect a weather-tight joint.

Such a window construction is disclosed in the accompanying drawings in which:

Fig. 1 is a front elevation of a window;

Fig. 2 is a partial section taken on the line 2—2 of Fig. 1; and

Fig. 3 is a partial section taken on the line 3—3 of Fig. 1.

The window shown in the drawings includes a frame 1 through which there is a window opening 2 that is defined by an external flange 3 and an internal flange 4. The frame 1 has two vertical side members 5 and 6. The internal flange 4 defining the window opening through the frame carries a gasket 7 that is mounted in a slot formed in the frame. The gasket 7 is a rubber gasket having a tubular section 7a that extends beyond the frame. The gasket extends axially of the window opening and surrounds the entire window opening.

To the side members 5 and 6, two window-pane guideways 8 and 9 are secured. These guideways are lined with felt 10 and are mounted on the frame so as to be movable laterally of the frame. There is one guideway on each side of the window opening through the frame and both guideways are identical in construction and the manner in which they are mounted on the window frame. The guideway 8 has secured thereto two brackets 9 and 10. The bracket 10 is slidably mounted upon a bolt 11 that extends from the window frame. The bracket 9 is similarly mounted on a bolt 12. Wing nuts 13 and 14 are provided for moving the guideway towards the inner flange of the window frame.

Within the window-pane guideways, there are slidably mounted two window panes 15 and 16. The upper window pane 15 is of substantially lesser length than the lower window pane 16 so that in the closed position of the window panes, that is, when the two window panes meet in the normal position, the edges of the window panes are materially above the vertical center of the window opening. When the window is mounted in the pilot-house of a ship, the window panes normally meet in the closed position at 5'4" above the floor of the pilot-house, the height of the eyes of the average man. The combined length of the two window panes is such that the window panes in the closed position extend substantially beyond the upper and lower edges of the window frame.

On the lower edge of the upper window pane there is mounted a U-shaped bracket 17 which carries a felt seal 18 that engages the upper edge of the lower window pane in the closed position of the window to form a weather-tight seal between the window pane. When the window-pane guideways are moved towards the window frame by the wing nuts, the window panes are brought tightly against the gasket in the window frame and a weather-tight seal is thus effected. In this manner, the window may be made weather-tight.

In bad weather, when vision is poor through a window glass, the window panes 15 and 16 may be separated about an inch to provide a vision slot for the pilot. By virtue of the fact that the window panes are substantially longer than the window opening, the position of the vision slot may be adjusted by lowering or raising the lower window pane to the height of the eyes of the particular pilot if he be taller or shorter than the height of the average man. For the purpose of moving and positioning the window panes in the guideways, there are provided ordinary manual clamps 19, one on each side of each window pane adjacent the meeting edges of the window panes.

From the foregoing description of the window construction described in the drawings it will be seen that there is provided a window construction which may be made weather-tight and with which a vision slot may be formed. When a vision slot of approximately an inch is formed in this window, and the rest of the window maintained weather-tight, that is, pressed against the gasket in the frame, and the pilot-house closed, very little air comes through this vision slot and the pilot has clear vision. When desirable, the entire window may be made weather-tight by bringing the adjacent edges of the two window panes together and clamping the window against the weather-tight gasket in the frame.

It will be obvious that various changes may be made by those skilled in the art in the details of the embodiment of the invention disclosed in the drawings and described above within the principle and scope of the invention as expressed in the appended claims.

I claim:

1. A pilot-house window adapted to provide a vision slot for a pilot comprising in combination a window frame having a window opening therethrough, a gasket extending from the frame axially of the window opening and surrounding the window opening, a pair of window-pane guideways mounted on the window frame for movement laterally thereof, one on each side of the window opening through the frame, a pair of window panes slidably mounted in the window-pane guideways, the window panes meeting in the closed position at a point above the center of the window opening and extending beyond the gasket a substantial amount, a weather-tight sealing means carried on the edge of one of the window panes, and means for moving the window-pane guideways laterally of the frame to effect a sealing engagement of the window panes and the gasket.

2. A pilot-house window adapted to provide a vision slot for a pilot comprising in combination a window frame having a window opening therethrough, a gasket extending from the frame axially of the window opening and surrounding the window opening, a pair of window-pane guideways mounted on the window frame for movement laterally thereof, a pair of window panes mounted in the window-pane guideways, the window panes being of different lengths and meeting in the closed position above the longitudinal center of the window frame and the combined length of the window panes being substantially greater than the window opening for adjusting the position of a slot formed by separating the window panes, a weather-tight sealing means carried on the edge of one of the window panes, and means for moving the window-pane guideways laterally of the frame to effect a weather-tight seal between the window panes and the gasket carried by the frame.

WALDO L. KRAEMER.